April 26, 1932. W. F. SCHACHT 1,855,316
CASTER WHEEL
Filed Sept. 12, 1930
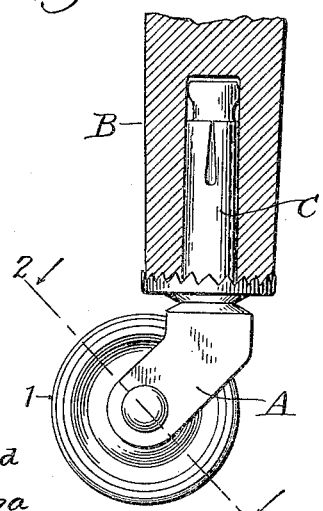
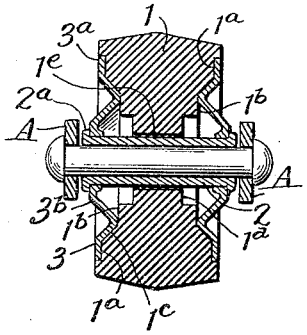
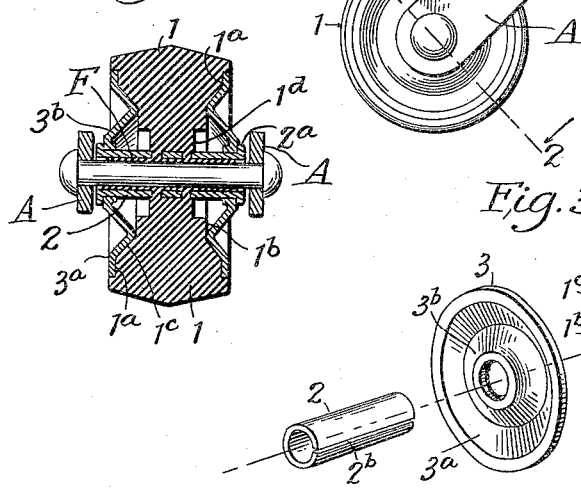
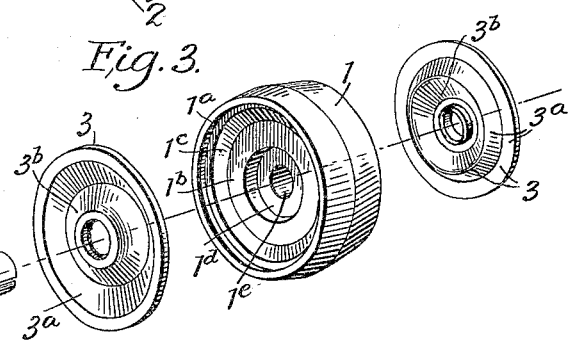
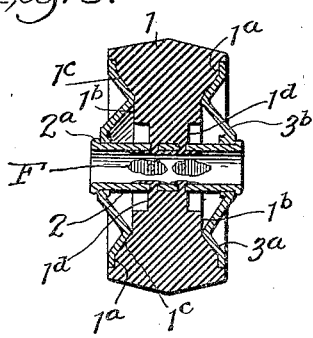
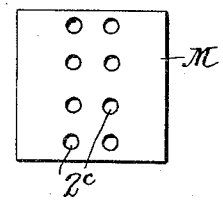
Inventor
William F. Schacht
By Alexander H. Dowell
Attorney Patented Apr. 26, 1932

1,855,316

UNITED STATES PATENT OFFICE

WILLIAM F. SCHACHT, OF HUNTINGTON, INDIANA

CASTER WHEEL

Application filed September 12, 1930. Serial No. 481,549.

This invention is a novel improvement in caster wheels particularly adapted for articles of furniture, and the principal object of the invention is to provide a caster wheel of solid rubber with means for preventing distortion of the rubber body and for maintaining a tamper or crown at the periphery of the rubber wheel.

A further object of the invention is to provide a caster wheel of the above type with a novel bushing molded in the center of the roller, the bushing having slots or perforations therein so that the rubber during the molding operation will flow into or through the slots or perforations and form a film or patches of rubber on the inside of the bushing, whereby the roller when mounted upon an axle will rotate substantially noiselessly.

Other minor objects of the invention will be hereinafter set forth.

I will explain the invention with reference to the accompanying drawings which illustrate several practical embodiments thereof to enable others to adopt and use the same; and will summarize in the claims the novel features of construction, and novel combinations of parts, for which protection is desired.

In said drawings:

Fig. 1 is a view partly in section of a caster applied to the leg of an article of furniture, said caster having my novel wheel mounted therein.

Fig. 2 is a transverse section on the lines 2—2, Fig. 1, showing one form of assembled caster wheel.

Fig. 3 is an expanded perspective view of the parts of the wheel detached.

Fig. 4 is a transverse section similar to Fig. 2 showing a modified form of wheel.

Fig. 5 is a transverse section through a still further modified form of caster wheel.

Fig. 6 is a perspective view of the perforated bushing.

Fig. 7 is a plan view of a sheet metal perforated blank from which the bushing is rolled.

The fork-shaped holder A of the caster may be applied to the leg B of the article of furniture by means of a plug C as shown in Fig. 1, or the plug may be replaced by other means, the particular type of caster pintle retainer forming no part of my present invention.

My novel caster wheel consists of an all-rubber moulded body portion 1 of cylindrical shape and having substantial width. Each side face of the body 1 is provided with a shallow annular recess 1a extending substantially to the periphery of the body. Within the recess 1a concentric with the axis of the body 1 is a second annular recess 1b of smaller diameter, said recess 1b having an outwardly flaring or tapered wall 1c extending from the recess 1b to recess 1a. Within the recess 1b and coaxial therewith is a still smaller recess 1d, and extending through the recess 1d (Fig. 2) is an axial bore 1e adapted to receive the bushing 2, hereinafter described. Thus each side face of the rubber body 1, as clearly indicated in Fig. 3, is stepped with the wider and heavier portions of the body outermost adjacent the periphery and the thinner and lighter portions of the body innermost adjacent the axis of the body.

Cooperating with the recesses in each side face of the body 1 are side plates 3 of concavo-convex shape, the concave portions 3a of the side plates 3 conforming in cross-section with the recesses 1a and 1b and the inclined wall 1c between said recesses as clearly indicated in Figs. 2 and 3. The central portion 3b of each side plate is convex and projects outwardly away from the central portion of the body as clearly indicated, and is provided with an axially disposed perforation adapted to receive the end of the bushing 2.

The side plates 3 are preferably made of sheet metal stamped to conform in area and contour with the recesses in the body 1, and side plates 3 placed at each side of the roller body and fit snugly within the recesses. The bushing 2 is inserted through the perforations at the center of the side plates 3 and through the axial bore 1e in the body 1, and the ends of the bushing are riveted as at 2a over the outer faces of the side plates 3 as clearly indicated in Fig. 2 thereby locking the parts securely together. The bushing 2 not only holds the side plates 3 in position in the recesses to reinforce the rubber body, but the side plates 3 do not bite into or grip the rubber body. The rubber wheel 1 is preferably provided with a crown, the same being higher at the center than at the sides.

In Fig. 4 a modification is shown in which the bushing 2 is moulded in the center of the rubber body. The bushing is preferably made from a flat piece of metal M rolled into cylindrical shape leaving an open seam 2b at the meeting edges of the rolled plate. If desired, the bushing before being rolled might be perforated as at 2c (Figs. 6 and 7) and then rolled into cylindrical shape of proper diameter. Owing to the seam 2b or perforations 2c, or both, during the moulding operation the rubber will flow into and through the seam or perforations and will form a film or patches of rubber on the inside of the bushing as indicated at F in Figs. 4 and 5, which film or patches F will cause the roller to rotate substantially noiselessly upon the caster shaft. In the modifications shown in Figs. 4 and 5 the ends of the bushing 2 would also be riveted over the side plates 3.

I do not limit my invention to the exact forms shown in the drawings for obviously changes may be made therein within the scope of the claims.

I claim:

1. A caster wheel comprising a molded rubber cylindrical body having an annular recess in each side adjacent its periphery, a second smaller annular recess adjacent the axis of the body, and an outwardly inclined wall extending from the outer edge of the inner recess to the inner edge of the outer recess; side plates having an outer annular portion fitted in the outer annular recess, and an annular concavo-convex portion whose outer wall fits against the inclined wall of the body; and a hollow bushing transfixing the body and connecting the side plates.

2. In a caster wheel as set forth in claim 1, said bushing being molded in the body and having openings filled by the rubber for the purpose specified.

3. A caster wheel comprising a molded rubber body; metal side plates at opposite sides of the body; and a hollow bushing molded in the body and connecting the side plates, said bushing having perforations therein filled by the rubber of the body to lock the bushing in the body.

4. In a caster as set forth in claim 3, said bushing comprising a cylindrical body having a longitudinal slot therein filled by the rubber of the body to lock the bushing therein.

5. A caster wheel, comprising a molded rubber cylindrical body having an annular stepped recess in each side adjacent its periphery, a second smaller annular recess adjacent the axis of the body and an outwardly inclined wall extending from the outer edge of the inner recess to the inner edge of the outer recess; side plates having an outer annular portion fitted in the outer annular recess, an annular concavo-convex portion whose outer wall fits against the inclined wall of the body, and a central conical projection opposite the smaller recess; and a hollow bushing transfixing the axis of the body and the conical portions of the side plates and securing the plates to the body.

6. In a caster wheel as set forth in claim 5, said bushing being molded in the body and having openings filled by the rubber for the purpose specified.

7. In a caster as set forth in claim 5, said bushing comprising a sheet metal cylindrical body having a longitudinal slot therein filled by the rubber of the body to lock the bushing therein.

WILLIAM F. SCHACHT.